P. L. DAVIS.
Velocipede.

No. 224,153. Patented Feb. 3, 1880.

Witnesses:

Inventor:
Percy L. Davis,
per Boone & Osborn
Attorneys.

UNITED STATES PATENT OFFICE.

PERCY L. DAVIS, OF SAN FRANCISCO, CALIFORNIA.

VELOCIPEDE.

SPECIFICATION forming part of Letters Patent No. 224,153, dated February 3, 1880.

Application filed October 25, 1879.

*To all whom it may concern:*

Be it known that I, PERCY L. DAVIS, of the city and county of San Francisco, in the State of California, have invented an Improved Velocipede; and I do hereby declare that the following is a full, clear, and exact description thereof, reference being had to the drawings accompanying this specification and forming a part of the same.

This invention relates to improvements in velocipedes or tricycles, the object of which is to utilize in a convenient and most effectual manner the united propelling action of the hands and feet; and it consists of a yoke or standards having a reach provided with a wheel or wheels, in combination with a wheel provided with a crank axle or shaft, and bell-cranks having a tiller, and connected by pitman or pitmen to the wheel-crank shaft by foot-cranks or treadles, substantially as hereinafter more fully set forth.

Figure 1:
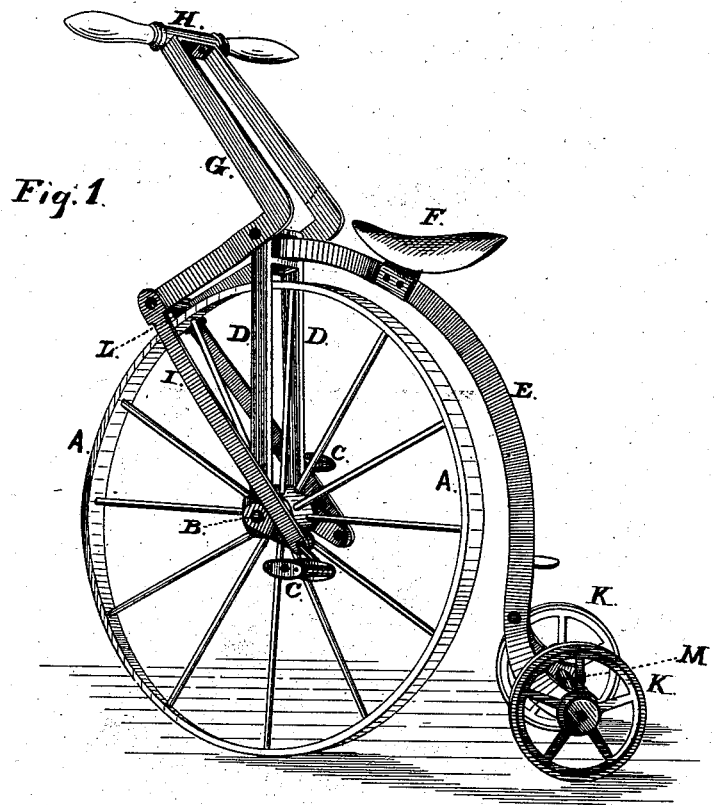
Figure 2:
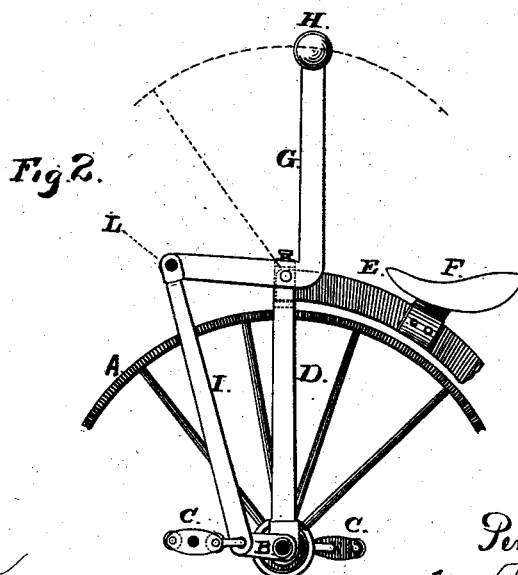

Referring to the accompanying drawings, Figure 1 is a perspective view of my improved velocipede, and Fig. 2 is an enlarged detail view of the driving mechanism.

Let A represent the driving-wheel of a velocipede, having the usual cranks B and pedals C for applying foot-power for propelling the vehicle.

D is the upright standard, which extends upward from the hub on each side of the wheel, and to the upper end of which the forward end of the reach E is attached by a horizontal swivel-joint. F is the saddle for the rider.

To the upper end of the standard D, I attach the angle of a bell-crank lever, G, by a pin or journal, so that one arm projects upward, while the other extends forward, as shown.

To the upper end of the vertical arm I secure the horizontal handle-bar H, while the extremity of the forward-projecting arm I connect with the driving-cranks B by means of connecting rods or pitmen I I.

Usually I shall employ two corresponding bell-cranks, G, one on each side, and connect the upward-projecting arms of the two bell-cranks to one handle-bar. I will then connect the outer ends of the forward-projecting arms rigidly together, and attach a connecting-bar, L, to each arm, so that one connecting-bar extends down to the driving-crank on each side of the wheel.

The handles, bell-cranks, and connecting-rods form a hand-power device, by means of which the rider can propel the velocipede, if desired, by forcing the handles forward and back by the strength of his arms and the weight of his body, and by using the pedal-cranks at the same time he can exert both leg and arm power for driving the vehicle. The handles at the same time serve the usual purpose of steering the vehicle by turning the driving-wheel in the usual way.

I am aware that, broadly, the use of means for utilizing the propelling action of both the hands and the feet in propelling velocipedes is old, and therefore make no claim to such combination, only when restricted to the limitations set forth in the recital of invention and claim.

By my invention velocipedes can be propelled up steeper grades and run with greater ease on ordinary roads than by means heretofore adopted for that purpose.

The handle-power also serves as a brake, which gives the rider complete control of the vehicle.

The vehicle which I make has one large wheel in front similar to the front wheel of a bicycle, which serves as the driving-wheel.

The reach E, I bend downward like the reach of a bicycle; but instead of using a single small wheel for sustaining the rear end of the reach I employ two small wheels, K K, which are placed on the opposite ends of a short axle, M.

The rear end of the reach is bifurcated, and the branches are spread apart and attached to the axle near each end, as shown. This forms a tricycle, which is made similar in general arrangement to a bicycle; but it is more steady and will not be so apt to overturn as the bicycle.

Having thus described my invention, what I claim, and desire to secure by Letters Patent, is—

The combination, with the yoke or standards D, having the reach E, provided with a wheel or wheels, K, and the wheel A, provided with the crank axle or shaft B, of the bell cranks and tiller H G, whose pitman or pitmen I are connected to the wheel-crank shaft B by the foot-cranks or treadles C C, substantially as and for the purpose set forth.

In witnesss whereof I have hereunto set my hand and seal.

PERCY L. DAVIS. [L. S.]

Witnesses:
 CHAS. E. KELLY,
 WM. H. CLARK.